US009569049B2

(12) United States Patent
Wang

(10) Patent No.: US 9,569,049 B2
(45) Date of Patent: Feb. 14, 2017

(54) CAPACITIVE TOUCH PANEL AND DISPLAY DEVICE WITH IMPROVED VISUAL EFFECT

(71) Applicant: BOE Technology Group Co., Ltd., Beijing (CN)

(72) Inventor: Minghsi Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 85 days.

(21) Appl. No.: 14/552,887

(22) Filed: Nov. 25, 2014

(65) Prior Publication Data

US 2016/0117012 A1 Apr. 28, 2016

(30) Foreign Application Priority Data

Oct. 27, 2014 (CN) .......................... 2014 1 0585139

(51) Int. Cl.
*G06F 3/044* (2006.01)

(52) U.S. Cl.
CPC ..... *G06F 3/044* (2013.01); *G06F 2203/04103* (2013.01)

(58) Field of Classification Search
CPC ............ G06F 3/044; G06F 2203/04103; G06F 2203/04111; G06F 2203/04112; G06F 1/16; G02F 1/1333; G02F 1/0316
See application file for complete search history.

(56) References Cited

U.S. PATENT DOCUMENTS

| 2009/0213090 A1* | 8/2009 | Mamba | G06F 3/044 345/174 |
|---|---|---|---|
| 2010/0045625 A1* | 2/2010 | Yang | G06F 3/044 345/173 |
| 2012/0236390 A1* | 9/2012 | Wang | G02B 26/001 359/291 |
| 2014/0043260 A1* | 2/2014 | Wang | G06F 3/047 345/173 |
| 2014/0063001 A1* | 3/2014 | Kim | G02B 27/2264 345/419 |

(Continued)

FOREIGN PATENT DOCUMENTS

| CN | 101655758 A | 2/2010 |
|---|---|---|
| CN | 203276235 U | 11/2013 |
| CN | 104035624 A | 9/2014 |

OTHER PUBLICATIONS

Sep. 30, 2016—(CN)—First Office Action Appn 201410585139.7 with English Tran.

*Primary Examiner* — Ariel Balaoing
*Assistant Examiner* — Darlene M Ritchie
(74) *Attorney, Agent, or Firm* — Banner & Witcoff, Ltd.

(57) ABSTRACT

A capacitive touch panel and a display device are provided. The touch panel includes a plurality of first electrodes disposed in a first electrode layer, and a plurality of second electrodes corresponding to the plurality of first electrodes and disposed in a second electrode layer; a first gap is formed between adjacent the first electrodes, and a second gap is formed between adjacent the second electrodes; and an orthographic projection of each second gap on the first electrode layer overlaps a part or all of the first gap to which the second gap corresponds and a part of at least one of the first electrodes. The touch panel can make it not easy for a user to observe electrode patterns and thereby improve the visual effect of the touch panel.

13 Claims, 3 Drawing Sheets

(56) References Cited

U.S. PATENT DOCUMENTS

| | | | |
|---|---|---|---|
| 2014/0292714 A1* | 10/2014 | Lee | G06F 3/046 345/174 |
| 2014/0320448 A1* | 10/2014 | Kim | G06F 3/044 345/174 |
| 2015/0022735 A1* | 1/2015 | Hsu | G06F 3/044 349/12 |
| 2015/0130751 A1* | 5/2015 | Teraguchi | G02F 1/13338 345/174 |
| 2015/0160754 A1* | 6/2015 | Wenzel | G06F 3/044 345/174 |
| 2015/0378485 A1* | 12/2015 | Nakamura | G09G 3/36 345/174 |
| 2016/0026046 A1* | 1/2016 | Itoh | G02F 1/136213 257/43 |

\* cited by examiner

CAPACITIVE TOUCH PANEL AND DISPLAY DEVICE WITH IMPROVED VISUAL EFFECT

This application claims priority to Chinese Patent Application No. 201410585139.7, filed on Oct. 27, 2014. The present application claims priority to and the benefit of the above-identified application and is incorporated herein in its entirety.

TECHNICAL FIELD

At least one embodiment of the present disclosure relates to a capacitive touch panel and a display device.

BACKGROUND

Touch screens can be seen everywhere around us, and touch screens save space to make it easier to be carried about and have better human-computer interaction in the field of personal portable apparatus such as PDAs. Touch screens can be classified into resistive type, capacitive type, surface acoustic wave type, and so on, depending on principles of operation. At present, most commercially available products adopt resistive and capacitive touch screens, especially the latter.

A capacitive touch screen operates with human body's induction by current with the principle of operation as follows. One or two layers of transparent metallic conducting substance are disposed on a surface of a glass substrate as touch electrodes. When a human body touches the touch screen, the capacitance of the touch electrode at the touched spot changes, and according to the change, the position of the touched spot on the touch screen can be detected.

A touch screen using a single layer of transparent metallic conducting substance as touch electrodes is called a surface capacitive touch screen. A touch screen using two layers of transparent metallic conducting substance as touch electrodes is called an inductive capacitive touch screen. As compared with surface capacitive touch screens, inductive capacitive touch screens can penetrate a thicker overlying layer without correction.

SUMMARY

At least one embodiment of the present disclosure provides a capacitive touch panel, which includes a plurality of first electrodes disposed in a first electrode layer and a plurality of second electrodes corresponding to the plurality of first electrodes and disposed in a second electrode layer; a first gap is formed between adjacent the first electrodes, and a second gap is formed between adjacent the second electrodes; and an orthographic projection of each second gap on the first electrode layer overlaps a part or all of the first gap to which the second gap corresponds and a part of at least one of the first electrodes.

At least one embodiment of the present disclosure provides a display device including the above-mentioned capacitive touch panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
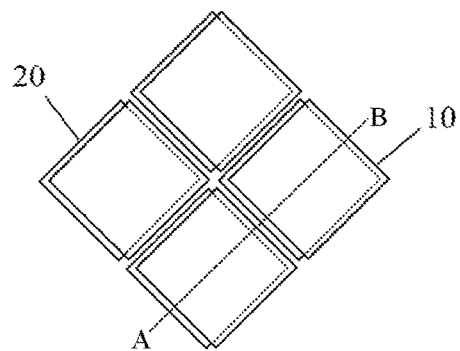
FIG. 1a is a schematic view of a partial electrode structure of a touch screen.
Figure 1B:
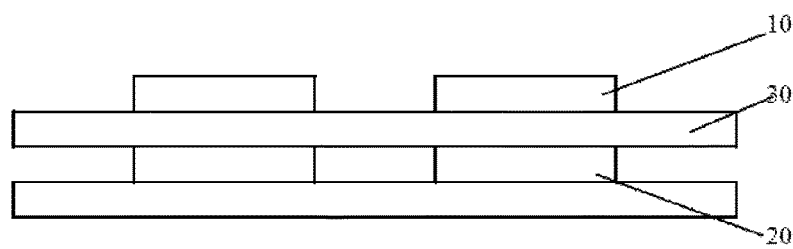
FIG. 1b is a sectional view of the electrode structure shown in FIG. 1a along a cutting ling A-B.

FIGS. 1a and 1b are schematic views of a partial electrode structure of a capacitive touch screen. The capacitive touch screen is an inductive capacitive touch screen including a plurality of second electrodes 20 and a plurality of first electrodes 10 corresponding to the plurality of second electrodes 20 disposed on the base substrate 40 in turn, the first electrodes 10 and the second electrodes 20 are on different layers respectively and there is an insulating layer therebetween. The width of a first electrode 10 and the width of a second electrode 20 are equal, and the width of a gap between the first electrodes 10 and the width of a gap between the second electrodes 20 are equal.

The inventor of the present application noticed that in the electrode structure of the touch screen shown in FIGS. 1a and 1b, the width of the gap between the patterned first electrodes 10 and the width of the gap between the patterned second electrodes 20 are usually 200 μm, and the touch screen is transparent, which can cause patterns of the first electrodes 10 and the second electrodes 20 easily visible by a user, hence imposing an adverse impact on the visual effect.

For example, a touch screen may include a touch panel and a display panel, and the touch panel is the chief component of the touch screen. In some structures, the touch panel and the display panel are basically integrated, for example, in an embedded capacitive touch screen.

At least one embodiment of the present disclosure provides a capacitive touch panel and a display device, and the capacitive touch panel includes a plurality of first electrodes disposed in a first electrode layer and a plurality of second electrodes corresponding to the plurality of first electrodes and disposed in a second electrode layer. In the capacitive touch panel, a first gap is formed between adjacent the first electrodes, and a second gap is formed between adjacent the second electrodes. An orthographic projection of the second gap on the first electrode layer overlaps a part or all of the first gap to which the second gap corresponds and a part of at least one of the first electrodes.

In at least one embodiment of the present disclosure, by designing the pattern of transparent electrodes, orthographic projections on the first electrode layer of at least one set of side corresponding surfaces of a first electrode and a second electrode disposed on different layers have no overlap (namely staggered from each other). Therefore, light exhibits gradient luminance after passing in turn a second gap and a first gap, which makes it not easy for a user to observe the pattern of the electrodes, and thus improves the visual effect of the touch panel and the display effect.

The capacitive touch panel and display device in embodiments of the present disclosure will be described in detail below with reference to accompanying drawings and with respect to an example in which side surfaces of both the first electrode and the second electrode are perpendicular to the first electrode layer. The following embodiments are only for illustration and the present disclosure is not limited thereto.

Thicknesses and shapes of all parts in the drawings do not reflect the real scale, but only serve to illustrate contents of embodiments of the present disclosure.

Figure 2:
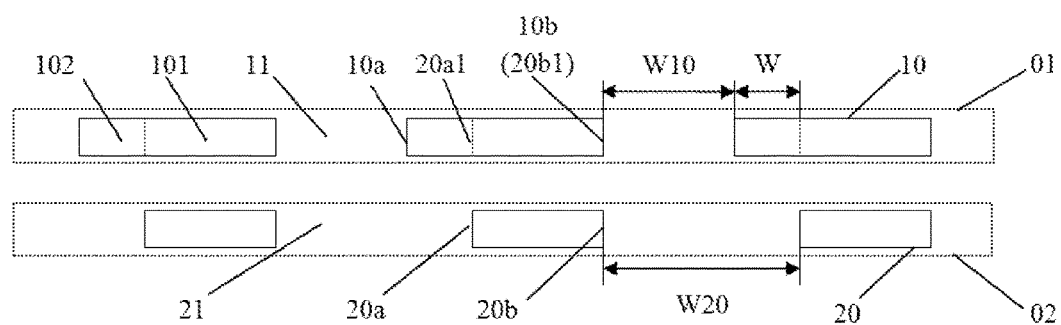
FIG. 2 is a schematic view of a partial electrode structure of a touch panel provided in one embodiment of the present disclosure.
Figure 3A:
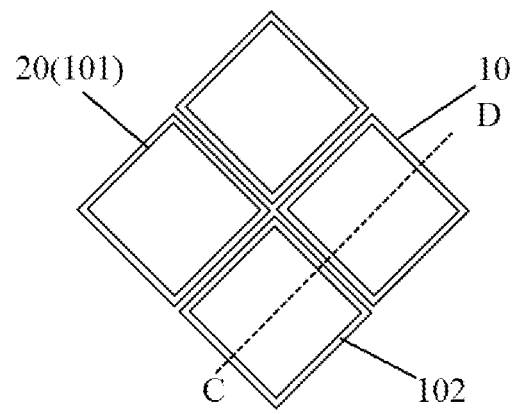
FIG. 3a is a schematic top view of a partial electrode structure of a touch panel provided in another embodiment of the present disclosure.
Figure 3B:
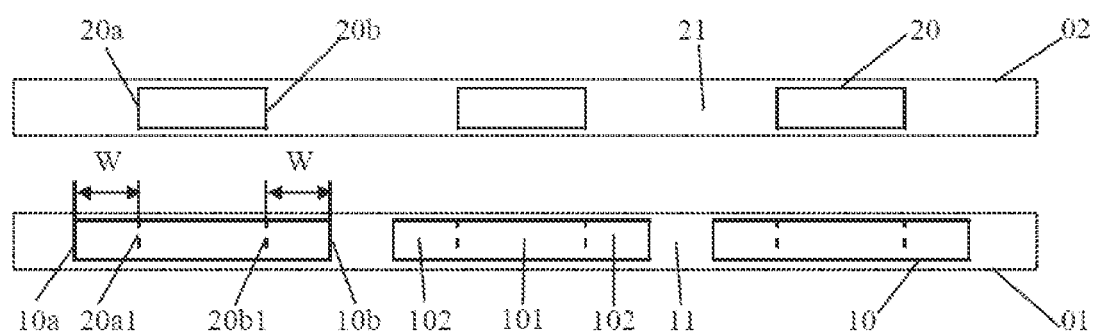
FIG. 3b is a sectional view of the electrode structure shown in FIG. 3a along a cutting ling C-D.

At least one embodiment of the present disclosure provides a capacitive touch panel, as shown in FIGS. 2, 3a and 3b, including: a plurality of first electrodes 10 disposed in a first electrode layer 01, and a plurality of second electrodes 20 corresponding to the plurality of first electrodes 10 and disposed in a second electrode layer 02. The first electrode layer 01 and the second electrode layer 02 are separated by an insulating layer (not shown in the figures), and may be, for example, on the same side of a substrate, or may be on two sides of a substrate respectively, for example. A first gap 11 is formed between adjacent the first electrodes 10, and a second gap 21 is formed between adjacent the second electrodes 20. An orthographic projection of the second gap 21 on the first electrode layer 01 overlaps a part or all of the first gap 11 to which the second gap 21 corresponds and a part of at least one of the first electrodes 10.

In at least one embodiment, as shown in FIGS. 2, 3a and 3b, each first electrode 10 may be divided into a body part 101 and a periphery part 102, the body part 101 corresponds to a second electrode 20 to which the first electrode 10 corresponds, and the periphery part 102 corresponds to a second gap 21 to which to the first electrode 101 corresponds.

As shown in FIG. 2, the first side surface 10a of the first electrode 10 is opposite to the second side surface 10b of the first electrode 10. Each first electrode 10 is divided into a body part 101 and a periphery part 102, the body part 101 is disposed on the side where the second side surface 10b is located, and the periphery part 102 is disposed on the side where the first side surface 10a is located, that is, the periphery part 102 is disposed on a side of the body part 101, the side of which is close to the first side surface 10a. In a set of corresponding side surfaces 10a and 20a of the first electrode 10 and the second electrode 20, an orthographic projection 20a1 of first side surface 20a of the second electrode 20 on the first electrode layer 01 is located at the border between the periphery part 102 and the body part 101. In another set of corresponding side surfaces 10b and 20b of the first electrode 10 and the second electrode 20, an orthographic projection 20b1 of the second side surface 20b of the second electrode 20 on the first electrode layer 01 is located at the second side surface 10b of the first electrode and overlaps the second side surface 10b of the first electrode. Such a design makes the orthographic projection of the second gap 21 on the first electrode layer 01 overlaps the entire first gap 11 to which the second gap 21 corresponds and overlaps a part of a first electrode 10. FIG. 2 shows that orthographic projections of a set of corresponding side surfaces of a first electrode 10 and a second electrode 20 on the first electrode layer 01 have no overlap. However, embodiments of the present disclosure are not limited thereto. For example, FIG. 3a shows that orthographic projections of plurality sets of corresponding side surfaces of the first electrode 10 and the second electrode 20 on the first electrode layer 01 have no overlap.

FIG. 3b is a sectional view along a cutting line C-D in FIG. 3a, and shows three sets of corresponding first electrodes and second electrodes along the cutting line C-D direction. As shown in FIG. 3b, each first electrode 10 is divided into a body part 101 in the middle of the first electrode 10 and two periphery parts 102 on both sides of the body part 101 respectively along the direction of the cutting line C-D. In a set of corresponding side surfaces 10a and 20a of the first electrode 10 and the second electrode 20, an orthographic projection 20a1 of first side surface 20a of the second electrode 20 on the first electrode layer 01 is located at a border between a periphery part 102 and the body part 101. And, in another set of corresponding side surfaces 10b and 20b of the first electrode 10 and the second electrode 20, an orthographic projection 20b1 of second side surface 20b of the second electrode 20 on the first electrode layer 01 is located at a border between the other periphery part 102 and the body part 101. Such a design makes the orthographic projection of the second gap 21 on the first electrode layer 01 overlaps the entire first gap 11 to which the second gap 21 corresponds and partially overlaps two adjacent first electrodes 10.

In embodiments of the present disclosure, orthographic projections on the first electrode layer of at least one set of corresponding side surfaces of a first electrode and a second electrode disposed on different layers have no overlap. Therefore, light exhibits gradient luminance after passing in turn the second gap and the first gap, which makes it not easy for a user to observe the pattern of the electrodes, and thus improves the visual effect of the touch panel and the display effect.

In at least one embodiment of the present disclosure, as shown in FIGS. 2 and 3b, the ratio of the width W of the periphery part 102 (the width of the periphery part 102 in a direction in which the periphery part 102 protrudes from the body part 101) to the width W20 of the second gap 20 may be greater than or equal to 1/3 and be less than or equal to 1/2. This proportion range can make the light passing the second gap and the first gap in turn exhibit a relatively gentle gradient of luminance variations, and thereby can realize a better effect of making it not easy for a user to observe the electrode patterns.

It is to be noted that the above-mentioned proportion range is a preferable range, and embodiments of the present disclosure are not limited thereto. Of course, too small or too large ratio of the width W of the periphery part 102 to the width W of the second gap 21 is not suitable. When the above-mentioned ratio is too small, the user can still observe electrode patterns easily. When the above-mentioned ratio is too large, the user is likely to observe overlapping electrode patterns. It follows that the effect that the user can not observe electrode patterns easily is not obvious when the above-mentioned ratio is too small or too large.

Furthermore, it can be seen from FIGS. 2 and 3b that the positions of the first electrode 10 and the second electrode 20 may be exchanged. That is, in at least one embodiment of the present disclosure, a plurality of first electrodes 10 may be disposed on the display surface side of the capacitive touch panel (namely disposed on the upper side in the figures), and a plurality of second electrodes 20 is disposed on the side away from the display surface side of the capacitive touch panel (namely disposed on the bottom side in the figures), as shown in FIG. 2. Alternatively, a plurality of second electrodes 20 may be disposed on the display surface side of the capacitive touch panel, and a plurality of first electrodes 10 is disposed on the side away from the display surface side of the capacitive touch panel, as shown in FIG. 3b. In embodiments of the present disclosure, for example, electrodes disposed on the display surface side of the touch panel may be touch sensing electrodes, and electrodes disposed on the side away from the display surface side of the touch panel may be common electrodes.

In at least one embodiment, the periphery part 102 may be on at least a part of the periphery of the body part 101. For example, FIG. 3a shows that the periphery part 102 is located on the entire periphery of the body part 101. It is to be noted that the periphery part may be an entirety, or may include a plurality of constituent parts. For example, in the top view shown in FIG. 4, the first electrode 10 and the second electrode 20 correspond to each other (and hence overlap each other in the figure), an orthographic projection of the body part 101 in the first electrode 10 on the second electrode layer overlays the second electrode 20, and an orthographic projection of a periphery part 102 on the second electrode layer includes a plurality of triangular structures.

In embodiments of the present disclosure, orthographic projections of at least a set of corresponding side surfaces of a first electrode and a second electrode on the first electrode layer have no overlap. In at least one embodiment and in the above-mentioned at least one set of corresponding side surfaces, the shapes of each set of corresponding side surfaces may be identical or different. That is, a side surface of a first electrode and with a periphery part may have a same shape as or a different shape from the side surface of the second electrode to which the first electrode corresponds and the side surface of which is close to the periphery part. For example, in FIGS. 2 and 3b, both the first side surface 10a of the first electrode 10 and the first side surface 20a of the second electrode 20 may be planar or curved surfaces or a combination of a planar surface and a curved surface. For example, the curved surfaces may be ones with broken line shape or wavy shape.

Figure 4:
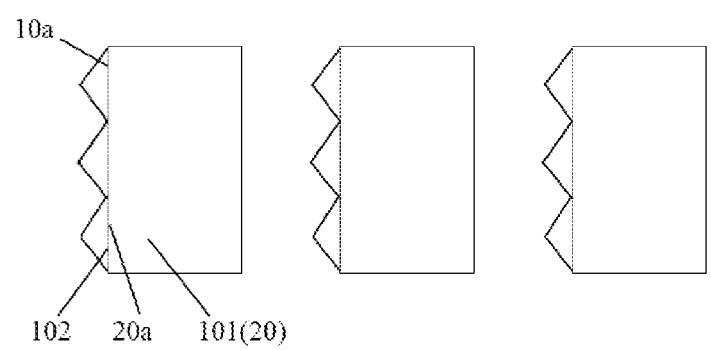
FIG. 4 is a schematic top view of a partial electrode structure of a touch panel provided in one embodiment of the present disclosure.

In at least one embodiment, the shape of the periphery part in the direction in which the periphery part protrudes from the corresponding body part may comprise at least one selected from the group consisting of rectangle, semi-circle and triangle. For example, FIG. 4 shows that the shape of the periphery part 102 in the direction in which the periphery part 102 protrudes from the body part 101 is a triangle. Embodiments of the present disclosure are not limited thereto.

In one embodiment, it is also possible that an orthographic projection of each first gap on the second electrode layer overlaps a part of the second gap to which the first gap corresponds and a part of a second electrode which is adjacent to the second gap. For example, a part of a first electrode and a part of a second electrode overlaps with each other, and the rest part of the first electrode and the rest part of the second electrode are staggered.

Figure 5:
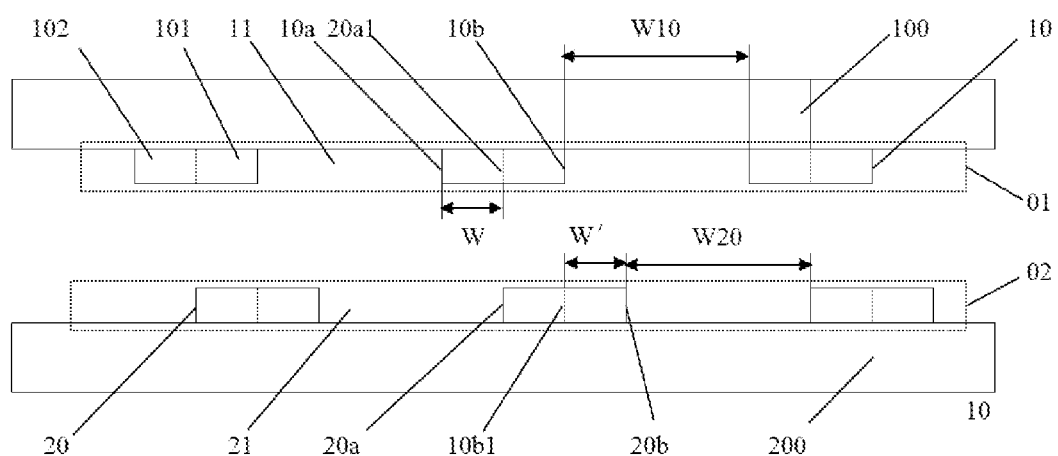
FIG. 5 is a sectional view of a partial electrode structure of a touch panel provided in yet another embodiment of the present disclosure.

For example, as shown in FIG. 5, a first electrode 10 is disposed on the display surface side of the touch panel and a second electrode 20 is disposed on the side away from the display surface side of the touch panel. In two sets of corresponding side surfaces (10a and 20a, 10b and 20b) of the first electrode 10 and the second electrode 20, an orthographic projection 20a1 of the first side surface 20a of the second electrode 20 on the first electrode layer 01 has no overlap with the first side surface 10a of the first electrode 10. And, an orthographic projection 10b1 of the second side surface 10b of the first electrode 10 on the second electrode layer 02 has no overlap with the second side surface 20b of the second electrode 20. Such a design makes the orthographic projection of each second gap 21 on the first electrode layer 01 overlaps a part of the first gap 11 to which the second gap corresponds and a part of a first electrode 10; and an orthographic projection of each first gap 11 on the second electrode layer 02 overlaps a part of the corresponding second gap 21 and a part of a second electrode 20. Here, the arrangement of the second electrode may refer to the arrangement of the first electrode in the above-mentioned embodiments, and repetitions are omitted herein.

In embodiments of the present disclosure, a part of a second electrode 20, corresponding to a first electrode 10, is a body part; and a part of the second electrode 20, corresponding to the first gap 11, is a periphery part. The ratio of the width W' of the periphery part of the second electrode 20 to the width W10 of the first gap 11 is greater than or equal to 1/3 and is less than or equal to 1/2. The width W' of the periphery part of the second electrode 20 may be identical with or different from the width W of the periphery part 102 of the first electrode 10.

The capacitive touch panel provided in at least one embodiment of the present disclosure may further include a first substrate 100 and a second substrate 200 that are disposed oppositely, and the first substrate 100 is closer to the display surface side of the capacitive touch panel than the second substrate 200, as shown in FIG. 5. The first electrodes and the second electrodes may be located on the first substrate and the second substrate respectively, or the first electrodes and the second electrodes are located on a surface of the first substrate, close to the display surface side, and a surface of the first substrate, away from the display surface side, respectively, or the first electrodes and the second electrodes are located on two layers of the second substrate, which two layers are close to the display surface side, respectively. It is to be noted that embodiments of the present disclosure are not limited thereto, but any touch panel with a two-layer touch electrode structure may be suitable.

It is to be noted that in the capacitive touch panel provided in the above-mentioned embodiments of the present disclosure, the shapes of a first electrode and a second electrode, in electrode layers where the first electrode and second electrode are located respectively, may be of any pattern, such as diamond, square and cross. Those skilled in the art should understand that the shapes of the first electrode and the second electrode, in electrode layers where the first electrode and the second electrode are located respectively, do not affect the design, provided in embodiments of the present disclosure, of making it not easy for a user to observe electrode patterns by making orthographic projections, on the first electrode layer, of at least one set of corresponding side surfaces of a first electrode and a second electrode that are disposed in different layers have no overlap.

At least one embodiment of the present disclosure further provides a display device including the above-mentioned capacitive touch panel. The display device may be any product or part with touch and display function, such as a touch screen, an electronic paper, a cell phone, a tablet computer, a TV set, a display, a notebook computer, a digital picture frame, a navigator, and a watch.

What are described above is related to the illustrative embodiments of the disclosure only and not limitative to the scope of the disclosure; the scopes of the disclosure are defined by the accompanying claims.

The invention claimed is:

1. The last limitation should read:
each of the first electrodes comprises a body part and a periphery part, the periphery part is directly connected to the body part, the body part corresponds to a second electrode to which the first electrode corresponds, and the periphery part corresponds to the second gap to which the first electrode corresponds, and a ratio of a width of the periphery part to a width of the second gap is greater than or equal to 1/3 and is less than or equal to 1/2.

2. The capacitive touch panel of claim 1, wherein orthographic projections of at least one set of corresponding side surfaces of the first electrode and the second electrode on the first electrode layer have no overlap, and each set of corresponding side surfaces in the at least one set of corresponding side surfaces have identical or different shapes.

3. The capacitive touch panel of claim 1, wherein a shape of the periphery part in a direction in which the periphery part protrudes from the corresponding body part comprises at least one selected from the group consisting of rectangle, semi-circle and triangle.

4. The capacitive touch panel of claim 1, wherein an orthographic projection of each of the first gaps on the second electrode layer overlaps a part of a corresponding second gap and a part of one of the second electrodes.

5. The capacitive touch panel of claim 1, wherein shapes of the first electrodes and the second electrodes in their respective electrode layers comprise diamond, square or cross.

6. The capacitive touch panel of claim 1, wherein the periphery part is located on at least a part of a periphery of the body part.

7. The capacitive touch panel of claim 6, wherein orthographic projections of at least one set of corresponding side surfaces of the first electrode and the second electrode on the first electrode layer have no overlap, and each set of corresponding side surfaces in the at least one set of corresponding side surfaces have identical or different shapes.

8. The capacitive touch panel of claim 6, wherein a shape of the periphery part in a direction in which the periphery part protrudes from the corresponding body part comprises at least one selected from the group consisting of rectangle, semi-circle and triangle.

9. The capacitive touch panel of claim 6, wherein an orthographic projection of each of the first gaps on the second electrode layer overlaps a part of a corresponding second gap and a part of one of the second electrodes.

10. The capacitive touch panel of claim 6, wherein the plurality of the first electrodes is disposed on a display surface side of the capacitive touch panel, and the plurality of the second electrodes is disposed on a side away from the display surface side of the capacitive touch panel; or
the plurality of the second electrodes is disposed on the display surface side of the capacitive touch panel, and the plurality of the first electrodes is disposed on a side away from the display surface side of the capacitive touch panel.

11. The capacitive touch panel of claim 1, wherein the plurality of the first electrodes is disposed on a display surface side of the capacitive touch panel, and the plurality of the second electrodes is disposed on a side away from the display surface side of the capacitive touch panel; or
the plurality of the second electrodes is disposed on the display surface side of the capacitive touch panel, and the plurality of the first electrodes is disposed on a side away from the display surface side of the capacitive touch panel.

12. The capacitive touch panel of claim 11, further comprising: a first substrate and a second substrate disposed oppositely, wherein
the first substrate is disposed closer to the display surface side of the capacitive touch panel than the second substrate; and
the first electrodes and the second electrodes are located on the first substrate and the second substrate respectively, or
the first electrodes and the second electrodes are located on a surface of the first substrate, close to the display surface side, and a surface of the first substrate, away from the display surface side, respectively, or
the first electrodes and the second electrodes are located on two layers of the second substrate, which two layers are close to the display surface side, respectively.

13. The last limitation should read
each of the first electrodes comprises a body part and a periphery part, the periphery part is directly connected to the body part, the body part corresponds to a second electrode to which the first electrode corresponds, and the periphery part corresponds to the second gap to which the first electrode corresponds, and a ratio of a width of the periphery part to a width of the second gap is greater than or equal to 1/3 and is less than or equal to 1/2.

* * * * *

UNITED STATES PATENT AND TRADEMARK OFFICE
CERTIFICATE OF CORRECTION

PATENT NO. : 9,569,049 B2
APPLICATION NO. : 14/552887
DATED : February 14, 2017
INVENTOR(S) : Wang It is certified that error appears in the above-identified patent and that said Letters Patent is hereby corrected as shown below:

In the Claims

Column 7, Line 32, Claim 1 should read:
1. A capacitive touch panel comprising:
a plurality of first electrodes disposed in a first electrode layer, and
a plurality of second electrodes corresponding to the plurality of the first electrodes and disposed in a second electrode layer,
wherein a first gap is formed between the adjacent first electrodes, and a second gap is formed between the adjacent second electrodes;
an orthographic projection of each second gap on the first electrode layer overlaps a part or all of the first gap to which the second gap corresponds and a part of at least one of the first electrodes; and
each of the first electrodes comprises a body part and a periphery part, the periphery part is directly connected to the body part, the body part corresponds to a second electrode to which the first electrode corresponds, and the periphery part corresponds to the second gap to which the first electrode corresponds, and a ratio of a width of the periphery part to a width of the second gap is greater than or equal to 1/3 and is less than or equal to 1/2.

Column 8, Line 55, Claim 13 should read:
13. A display device, comprising a capacitive touch panel, wherein the capacitive touch panel compnses:
a plurality of first electrodes disposed in a first electrode layer, and
a plurality of second electrodes corresponding to the plurality of the first electrodes and disposed in a second electrode layer,
wherein a first gap is formed between the adjacent first electrodes, and a second gap is formed between the adjacent second electrodes;
an orthographic projection of each second gap on the first electrode layer overlaps a part or all of the first gap to which the second gap corresponds and a part of at least oen of the first electrodes; and Signed and Sealed this
First Day of June, 2021

Drew Hirshfeld
*Performing the Functions and Duties of the
Under Secretary of Commerce for Intellectual Property and
Director of the United States Patent and Trademark Office* each of the first electrodes comprises a body part and a periphery part, the periphery part is directly connected to the body part, the body part corresponds to a second electrode to which the first electrode corresponds, and the periphery part corresponds to the second gap to which the first electrode corresponds, and a ratio of a width of the periphery part to a width of the second gap is greater than or equal to 1/3 and is less than or equal to 1/2.